US008837829B2

(12) United States Patent
Shimizu

(10) Patent No.: US 8,837,829 B2
(45) Date of Patent: Sep. 16, 2014

(54) IMAGE PROCESSING APPARATUS, STORAGE MEDIUM STORING IMAGE PROCESSING PROGRAM, AND IMAGE PROCESSING METHOD

(75) Inventor: Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/404,332

(22) Filed: Feb. 24, 2012

(65) Prior Publication Data

US 2012/0219219 A1 Aug. 30, 2012

(30) Foreign Application Priority Data

Feb. 28, 2011 (JP) ................................ 2011-042748

(51) Int. Cl.
*G06K 9/40* (2006.01)
*G09G 3/34* (2006.01)
*G09G 3/36* (2006.01)

(52) U.S. Cl.
CPC ............ *G09G 3/3406* (2013.01); *G09G 3/3611* (2013.01); *G09G 2320/0646* (2013.01); *G09G 2360/16* (2013.01); *G09G 2330/021* (2013.01); *G09G 2320/066* (2013.01)
USPC ........... 382/168; 382/167; 382/254; 345/690; 348/678

(58) Field of Classification Search
CPC .................... G09G 3/3406; G09G 2320/0646; G09G 2320/066; G09G 2330/021; G09G 2360/16; G09G 3/3611; G03B 21/2053; H04N 5/58; H04N 5/74
USPC ......... 382/168, 167, 169, 274, 171, 260, 282; 348/229.1, 333.01, 372, 672, 687; 396/282, 301
See application file for complete search history.

(56) References Cited

U.S. PATENT DOCUMENTS 6,212,304 B1 * 4/2001 Durg et al. .................... 382/254
7,113,227 B1 * 9/2006 Kakuya et al. ................ 348/678

(Continued)

FOREIGN PATENT DOCUMENTS

JP 2006-147573 6/2006
JP 2007-41535 2/2007

(Continued)

OTHER PUBLICATIONS

European Office Action for corresponding European Application 12156731.7-1228; dated Jun. 5, 2012.

(Continued)

*Primary Examiner* — Mekonen Bekele
(74) *Attorney, Agent, or Firm* — Staas & Halsey LLP

(57) ABSTRACT

An image processing apparatus includes; a generation unit to generate a histogram of luminance values of a plurality of pixels included in an image; a luminance value calculation unit to calculate a first luminance value at which first ratio pixels of the plurality of pixels are present in descending order of the luminance values of the histogram, and a second luminance value at which second ratio pixels of the plurality of pixels are present, the second ratio pixels is larger than the first ratio pixels; a selection unit to compare the first luminance value and the second luminance value, and determine a third luminance value that is set a maximum luminance value in gradation correction; and a correction unit to perform the gradation correction that corrects the luminance values of the plurality of pixels on the basis of the third luminance value.

12 Claims, 12 Drawing Sheets

(56) References Cited

U.S. PATENT DOCUMENTS

| | | | | |
|---|---|---|---|---|
| 8,311,356 | B2 * | 11/2012 | Shimizu et al. | 382/254 |
| 8,330,869 | B2 * | 12/2012 | Murashita et al. | 348/630 |
| 8,339,518 | B2 * | 12/2012 | Kida et al. | 348/672 |
| 8,471,874 | B2 * | 6/2013 | Sato et al. | 345/690 |
| 2006/0120082 | A1 | 6/2006 | Choo et al. | |
| 2006/0127081 | A1 * | 6/2006 | Lee et al. | 396/282 |
| 2007/0018951 | A1 | 1/2007 | Nobori et al. | |
| 2007/0273628 | A1 * | 11/2007 | Sato et al. | 345/87 |
| 2008/0170030 | A1 | 7/2008 | Oshige | |
| 2008/0198101 | A1 * | 8/2008 | Song et al. | 345/63 |
| 2008/0246883 | A1 * | 10/2008 | Murashita et al. | 348/649 |
| 2010/0053384 | A1 * | 3/2010 | Manabe | 348/254 |
| 2011/0128305 | A1 * | 6/2011 | Shimizu | 345/690 |

FOREIGN PATENT DOCUMENTS

| | | | | | |
|---|---|---|---|---|---|
| JP | 2008-175880 | | | 7/2008 | |
| JP | 2009-017229 | | | 1/2009 | |
| JP | 2010-10754 | | | 1/2010 | |
| JP | 2010010754 | A | * | 1/2010 | H04N 5/66 |
| JP | 2010-85524 | | | 4/2010 | |
| JP | 2010085524 | A | * | 4/2010 | G09G 3/36 |

OTHER PUBLICATIONS

Japanese Office Action for corresponding Japanese Application 2011-042748; dated Mar. 4, 2014.

* cited by examiner

IMAGE PROCESSING APPARATUS, STORAGE MEDIUM STORING IMAGE PROCESSING PROGRAM, AND IMAGE PROCESSING METHOD

CROSS-REFERENCE TO RELATED APPLICATION

This application is based upon and claims the benefit of priority of the prior Japanese Patent Application No.2011-42748, filed on Feb. 28, 2011, the entire contents of which are incorporated herein by reference.

FIELD

Embodiments relate to an image processing apparatus, a storage medium storing an image processing program, and an image processing method.

BACKGROUND

A technique for improving quality of an image displayed on a display apparatus by correcting the image has been proposed. For example, examples of a technique for increasing the contrast of an image include a gradation correction technique for correcting the gradation of luminance values set for pixels. Japanese Laid-open Patent Publication Nos. 2008-175880 and 2009-17229 disclose such a gradation correction technique. For example, in the gradation correction, the histogram of luminance values of pixels included in a display target image is generated and a region including a certain ratio of pixels in descending order of their luminance values is set as a cut-off region. This cut-off region is, for example, a region including pixels corresponding to 0.5% of all pixels. In the related art, a highlight value that is the minimum value among the luminance values included in the cut-off region is changed to the maximum luminance value in the histogram. Thus, in the related art, the gradation of luminance values set for pixels is corrected. The gradation correction is also referred to as dynamic range correction.

There is also a technique employed in a display apparatus for displaying an image with a backlight. The technique reduces power consumption while maintaining image quality by increasing the luminance value of an image with the above-described gradation correction technique and reducing the amount of light of the backlight.

SUMMARY

According to an aspect of the invention, an image processing apparatus includes; a generation unit configured to generate a histogram of luminance values of a plurality of pixels included in an image; a luminance value calculation unit configured to calculate a first luminance value at which first ratio pixels of the plurality of pixels are present in descending order of the luminance values of the histogram, and a second luminance value at which second ratio pixels of the plurality of pixels are present, the second ratio pixels is larger than the first ratio pixels; a selection unit configured to compare the first luminance value and the second luminance value, and determine a third luminance value that is set a maximum luminance value in gradation correction on the basis of a result of the comparing; and a correction unit configured to perform the gradation correction that corrects the luminance values of the plurality of pixels on the basis of the third luminance value and generate a corrected image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Increasing a contrast is considered to be useful not only for maintaining image quality but also other cases. For example, in a case where a display screen on which an image is displayed is exposed to sunlight, reflected light may reduce the contrast of a displayed image and a viewer may not visually recognize the displayed image. In this case, an image output on the display screen is changed to a white blurred image for the viewer since the reflected light of sunlight is added to the amount of light supplied from a light source included in a display apparatus. For the above-described case where a display screen is exposed to direct sunlight, increasing a contrast to the extent allowing a viewer to visually recognize a displayed image is considered to be useful.

Furthermore, increasing a contrast is also useful for, for example, a case where the minimization of power consumption of a display apparatus is demanded. More specifically, the minimization of power consumption of an in-car monitor is demanded in an electric car so as to preferentially supply power to a driving system. When the amount of light of a backlight is reduced for reduction in power consumption in this case, a display screen becomes dark. That is, a viewer visually recognizes the reduction in contrast. Accordingly, in a case where the minimization of power consumption is demanded, the amount of light is reduced, and a viewer recognizes the reduction in contrast caused by the reduction in the amount of light, it is considered to be useful to increase the contrast.

However, in the above-described related art, when a cut-off region is increased so as to increase a contrast, degradation in image quality sometimes occurs. For example, a contrast can be increased by setting a large cut-off region. In contrast, however, since gradation values included in the cut-off region are unified into a single gradation value, the change in a gradation level in the cut-off region is not visually recognized. A phenomenon where the change in a gradation level in a cut-off region is not visually recognized is hereinafter referred to as blown out highlights. In particular, in the case of an image including pixels having various luminance values, blown out highlights are easily recognized by a viewer.

Figure 10:
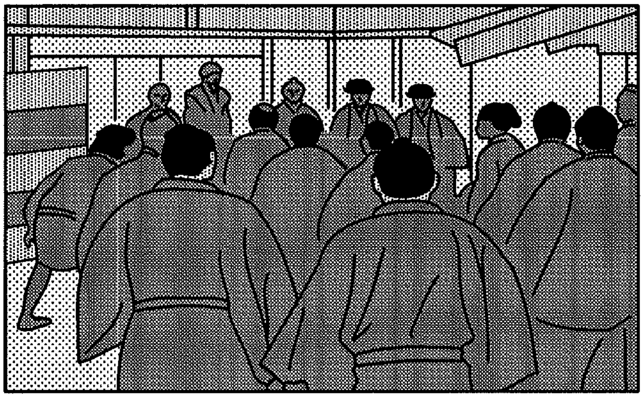
FIG. 10 is a diagram describing a problem in the related art.
Figure 11:
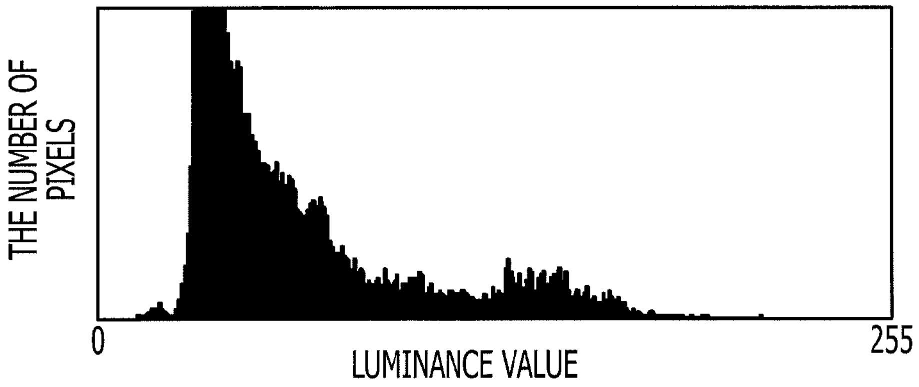
FIG. 11 is a diagram describing a problem in the related art.
Figure 12:
FIG. 12 is a diagram describing a problem in the related art.

FIGS. 10 to 12 are diagrams describing problems in the related art. FIG. 10 illustrates an example of an image before gradation correction. FIG. 11 illustrates a histogram of luminance values of a plurality of pixels included in the image illustrated in FIG. 10. In FIG. 11, a horizontal axis represents a luminance value and a vertical axis represents the number of pixels. For example, the range of the luminance values is 0 to 255, that is, 256 gradation levels. FIG. 12 illustrates an image obtained by performing gradation correction in the related art upon the image illustrated in FIG. 10.

As illustrated in FIGS. 10 and 11, an image before gradation correction includes pixels having various luminance values. A value used to set a cut-off region is referred to as a cut-off value. A region including luminance values of pixels, the number of which corresponds to a cut-off value, is a cut-off region. For example, it is assumed that a cut-off value is set to 10% and the range of the luminance values of pixels corresponding to 10% of all pixels is from 255 to 129. That is, in this case, the highlight value of the image illustrated in FIG. 10 is 129. In the related art, the gradation of luminance values set for the pixels is corrected so that the highlight value of 129 is set to the maximum luminance value of 255. A corrected image is as illustrated in FIG. 12. As illustrated in FIG. 12, the change in a gradation level illustrated in FIG. 10 does not appear and blown out highlights occurs in the gradation-corrected image. In particular, when a large cut-off value is set, blown out highlights are easily recognized by a viewer in an image in which the gradation of luminance values equal to or larger than a highlight value is present. The luminance value of an image to be displayed is optional. Accordingly, when gradation correction is performed on images with the same cut-off value, degradation in image quality occurs in accordance with the luminance value of an image.

Embodiments provide an image processing apparatus capable of increasing a contrast while suppressing degradation in image quality, a storage medium storing an image processing program, and an image processing method.

An image processing apparatus, a storage medium storing an image processing program, and an image processing method according to an embodiment will be described in detail below with reference to the accompanying drawings. Embodiments do not limit technologies disclosed herein. Embodiments may be combined as appropriate without causing inconsistencies among pieces of processing.

[First Embodiment]

Figure 1:
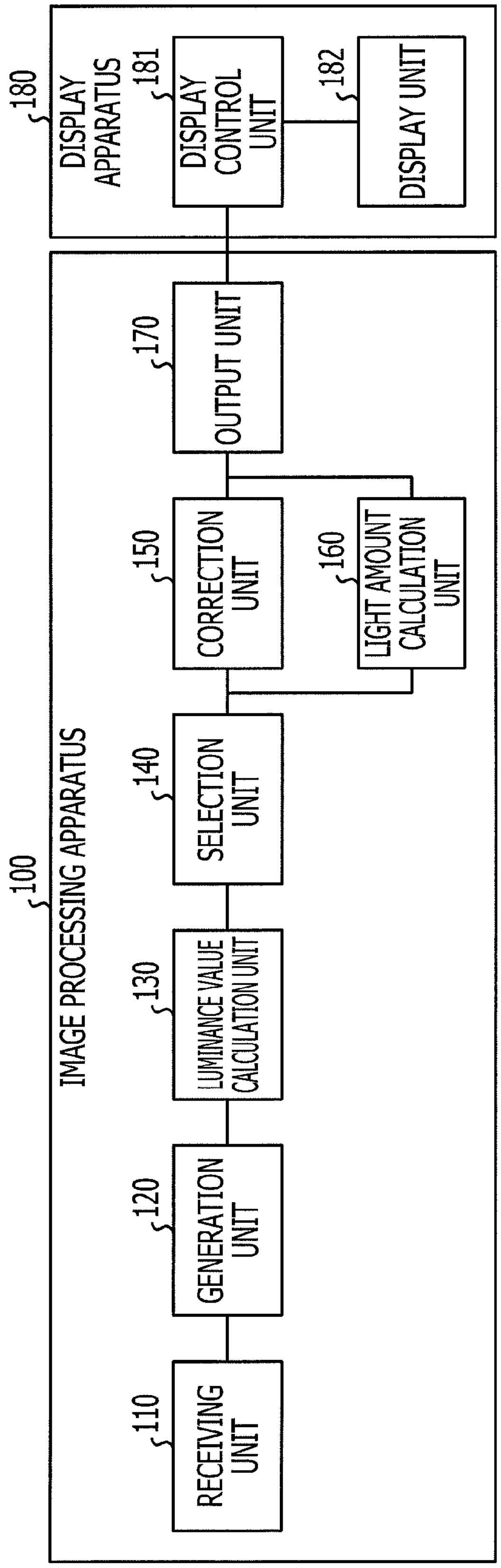
FIG. 1 is a functional block diagram of an image processing apparatus according to a first embodiment.

An image processing apparatus according to the first embodiment will be described. FIG. 1 is a diagram illustrating the functional configuration of an image processing apparatus according to the first embodiment. An image processing apparatus 100 includes a receiving unit 110, a generation unit 120, a luminance value calculation unit 130, a selection unit 140, a correction unit 150, a light amount calculation unit 160, and an output unit 170. The image processing apparatus 100 is connected to a display apparatus 180. The display apparatus 180 includes a display control unit 181 and a display unit 182. The image processing apparatus 100 is, for example, a Large Scale Integration (LSI) or a graphics memory. The image processing apparatus 100 is suitable for the display of both a still image and a moving image. The display apparatus 180 is, for example, an in-car monitor, the screen of a computer, or a television screen. The image processing apparatus 100 may be a computer. In this case, the image processing apparatus 100 may include the display apparatus 180.

The receiving unit 110 receives an image. For example, the receiving unit 110 receives a display target image to be displayed by the display apparatus 180 from an image capturing apparatus or an external apparatus connected thereto via a network. The image capturing apparatus is, for example, a camera. The display target image is, for example, an image captured by the image capturing apparatus, an image downloaded from the external apparatus, or a TV broadcast image. The receiving unit 110 outputs the received display target image to the generation unit 120.

Figure 2A:
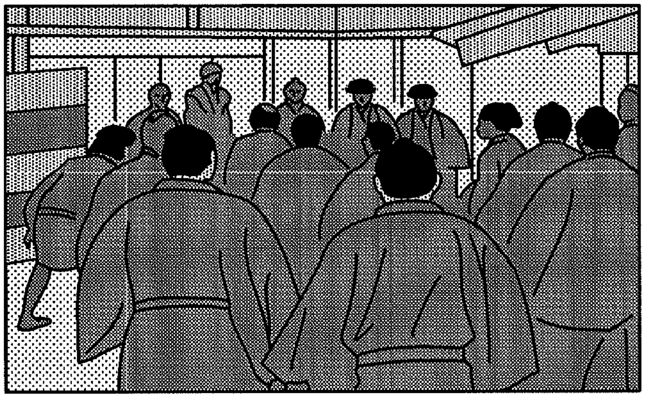
FIG. 2A is a diagram illustrating an example of a display target image.
Figure 2B:
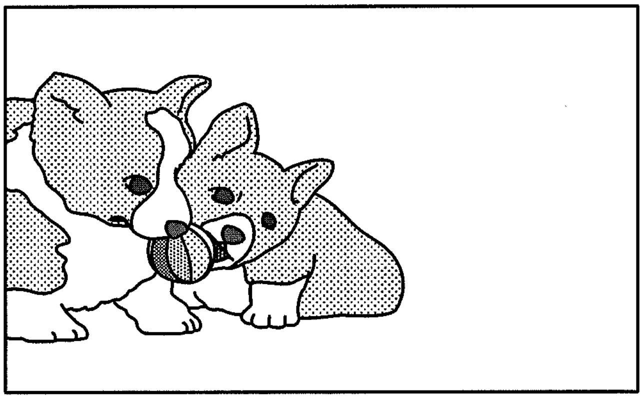
FIG. 2B is a diagram illustrating an example of a display target image.

FIGS. 2A and 2B are diagrams illustrating examples of a display target image. For example, the receiving unit 110 receives the display target image illustrated in FIG. 2A or 2B.

The generation unit 120 generates the histogram of luminance values of a plurality of pixels included in an image. For example, the generation unit 120 receives a display target image from the receiving unit 110. The generation unit 120 calculates the luminance value of each pixel included in the received display target image on the basis of the R, G, and B values of the pixel.

For example, a luminance value Y is calculated as represented by the following equation.

$$Y=0.299R+0.587G+0.144B$$

The generation unit 120 generates a histogram by counting the number of pixels for each gradation level on the basis of the calculated luminance values. An equation used to calculate the luminance value Y is not limited to the above-described equation, and, for example, a coefficient may be changed to any value. A case where the generation unit 120 generates a histogram on the basis of the luminance value of each pixel has been described, but other cases can be considered. For example, the generation unit 120 may generate a histogram on the basis of the R, G, and B values of each pixel. More specifically, the generation unit 120 generates a histogram by counting the number of pixels for each of R, G, and B gradation values.

Figure 3A:
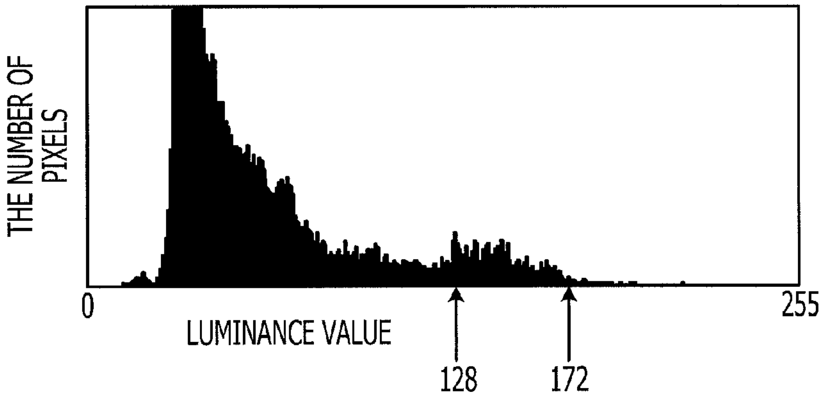
FIG. 3A is a diagram illustrating an example of a histogram.
Figure 3B:
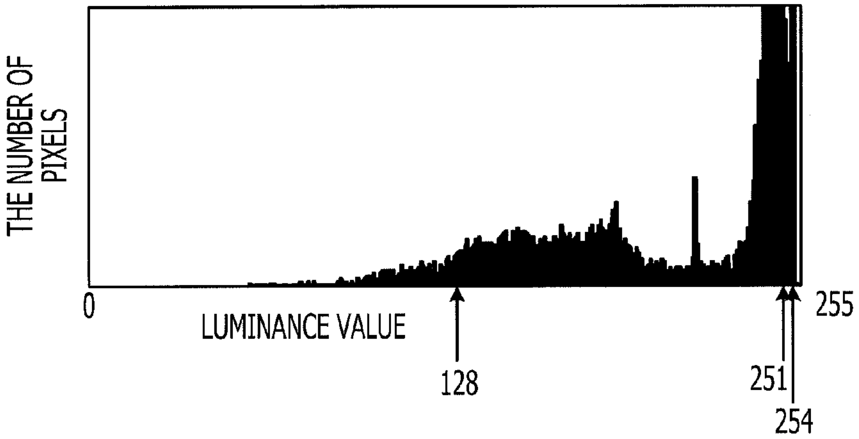
FIG. 3B is a diagram illustrating an example of a histogram.

FIGS. 3A and 3B are diagrams illustrating examples of a histogram. In FIGS. 3A and 3B, the vertical axis represents the number of pixels and the horizontal axis represents a luminance value. For example, the range of the luminance values is 0 to 255, that is, 256 gradation levels. The histogram illustrated in FIG. 3A is, for example, a histogram generated from the display target image illustrated in FIG. 2A. FIG. 3A illustrates the fact that the display target image includes many pixels having luminance values smaller than the luminance median value of 128. The histogram illustrated in FIG. 3B is, for example, a histogram generated from the display target image illustrated in FIG. 2B. FIG. 3B illustrates the fact that the display target image includes many pixels having luminance values larger than the luminance median value of 128.

The luminance value calculation unit 130 calculates a first luminance value in which a certain ratio of number of pixels exist in descending order and a second luminance value in which another certain ratio of number of pixels exist in descending order referring to the histogram that indicate distribution of pixels. Another certain ratio is larger that the certain ratio. For example, the luminance value calculation unit 130 calculates a luminance value A1 corresponding to the luminance value on which the ratio a1 of pixels exist in the histogram in descending order of luminance values of the pixels. And the luminance value calculation unit 130 calculates a luminance value A2 corresponding to the luminance value on which the ratio a2 of pixels exist in the histogram in descending order. The ratio a2 is larger than the ratio a1. The ratio a1 is preferably set to a value with which blown out highlights are invisible for a viewer regardless of the luminance values of pixels included in a display target image, and is set to, for example, 0.5%. The ratio a2 is preferably set to a value with which blown out highlights are visible for a viewer in accordance with the luminance values of pixels included in a display target image, and is set to, for example, 10.0%. The ratios a1 and a2 are not limited to the above-described examples, and may be optionally set by a user of the image processing apparatus 100.

For example, in a case where the image illustrated in FIG. 2A is processed, the luminance value calculation unit 130 refers to the histogram illustrated in FIG. 3A and calculates the luminance value A1=172corresponding to the ratio a1=0.5% and the luminance value A2=129corresponding to the ratio a2=10.0%. For example, in a case where the image illustrated in FIG. 2B is processed, the luminance value calculation unit 130 refers to the histogram illustrated in FIG. 3B and calculates the luminance value A1=254corresponding to the ratio a1=0.5% and the luminance value A2=251corresponding to the ratio a2=10.0%. The luminance value calculation unit 130 outputs the calculated luminance values A1 and A2 to the selection unit 140. The luminance value A1 is an example of a first luminance value, and the luminance value A2 is an example of a second luminance value.

The selection unit 140 compares the luminance values A1 and A2 calculated by the luminance value calculation unit 130 with each other and determines a luminance value A on the basis of a result of the comparison. The luminance value A is a highlight value that is the minimum luminance value in a cut-off region. For example, the selection unit 140 calculates the difference between the luminance values A1 and A2 calculated by the luminance value calculation unit 130, and sets the luminance value A2 as the luminance value A when the calculated difference is smaller than a threshold value. When the calculated difference is equal to or larger than the threshold value, the selection unit 140 sets a value between the luminance values A2 and A1 as the luminance value A. The selection unit 140 outputs the determined luminance value A to the correction unit 150 and the light amount calculation unit 160. For example, the threshold value is set so that it specifies the luminance value A2 with which blown out highlights are invisible for a viewer regardless of the luminance values of pixels included in a display target image when the luminance value A2 is set as the luminance value A. The threshold value is, for example, 9. The threshold value is not limited to the above-described example, and may be optionally set by a user of the image processing apparatus 100.

Figure 4:
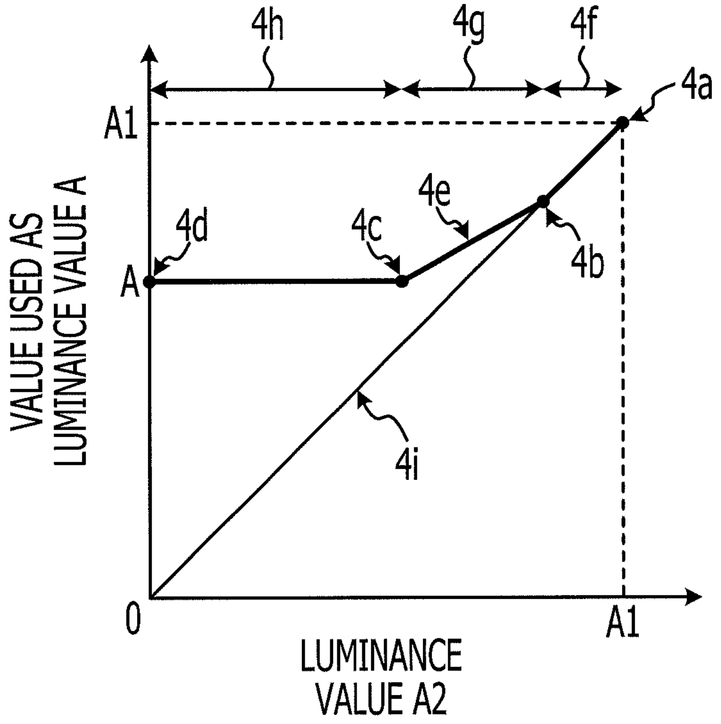
FIG. 4 is a diagram describing processing of a selection unit.

FIG. 4 is a diagram describing processing of the selection unit 140. In FIG. 4, the horizontal axis represents the luminance value A2 and the vertical axis represents a value used as the luminance value A. For example, the selection unit 140 calculates coordinates of four points, a point 4*a* (A1, A1), a point 4*b* (A1*0.95, A1*0.95), a point 4*c* (A1*0.85, A1*0.90), and a point 4*d* (0, A1*0.90), on the basis of the luminance value A1. The selection unit 140 generates an equation representing a curve 4*e* that connects the points 4*a* and 4*b*, the points 4*b* and 4*c*, and the points 4*c* and 4*d* with straight lines. The selection unit 140 calculates the luminance value A by substituting the luminance value A2 into the equation representing the curve 4*e*. Here, a region between the points 4*a* and 4*b*, a region between the points 4*b* and 4*c*, and a region between the points 4*c* and 4*d* are defined as regions 4*f*, 4*g*, and 4*h*, respectively in the curve 4*e*. A method of calculating the coordinates of the points 4*a* to 4*d* is not limited to the above-described method.

For example, a value multiplied by the luminance value A1 may be changed to an optional value by a user of the image processing apparatus 100. For example, the selection unit 140 may calculate the coordinates of the four points, the point 4*a* (A1, A1), the point 4*b* (A1*0.90, A1*0.90), the point 4*c* (A1*0.75, A1*0.80), and the point 4*d* (0, A1*0.80). Alternatively, for example, the coordinates of the points 4*a* to 4*d* may be calculated by subtraction. For example, the selection unit 140 may calculate the coordinates of the four points, the point 4*a* (A1, A1), the point 4*b* (A1-10, A1-10), the point 4*c* (A1-30, A1-20), and the point 4*d* (0, A1-20).

For example, the selection unit 140 calculates the difference between the luminance values A1 and A2, determines whether the calculated difference between the luminance values A1 and A2 is smaller than a threshold value, and determines the luminance value A on the basis of a result of the determination. The selection unit 140 may calculate the difference between the x-coordinate (A1) of the point 4*a* and the x-coordinate (A1*0.95) of the point 4*b* as the threshold value. In this case, when the luminance value A2 is included in the region 4*f*, the selection unit 140 sets the luminance value A2 as the luminance value A. On the other hand, when the calculated difference is equal to or larger than the threshold value, that is, the luminance value A2 is not included in the region 4*f*, the selection unit 140 sets a value between the luminance values A2 and A1 as the luminance value A. The luminance value A is an example of a third luminance value.

More specifically, when the luminance value A2 is included in the region 4*g*, the selection unit 140 calculates the luminance value A by substituting the luminance value A2 into an equation representing the straight line connecting the points 4*b* and 4*c*. When luminance value A2 is included in the region 4*h*, the selection unit 140 sets the y-coordinate of the point 4*d* as the luminance value A. A straight line 4*i* satisfies the equation of A=A2.

A case where the selection unit 140 processes the image illustrated in FIG. 2A will be described. The selection unit 140 calculates, with the luminance value A1=172calculated for the image illustrated in FIG. 2A, the coordinates of four points, the point 4*a* (172, 172), the point 4*b* (163, 163), the point 4*c* (146, 155), and the point 4*d* (0, 155), and generates an equation representing the curve 4*e*. Since the luminance value A2=129calculated for the image illustrated in FIG. 2A is included in the region 4*h*, the selection unit 140 sets luminance value A to the y-coordinate of the point 4*d*, that is, sets the luminance value A=155. The luminance value A=155 is between the luminance value A2=129and the luminance value A1=172.

A case where the selection unit 140 processes the image illustrated in FIG. 2B will be described. The selection unit 140 calculates, with the luminance value A1=254calculated for the image illustrated in FIG. 2B, the coordinates of four points, the point 4*a* (254, 254), the point 4*b* (241, 241), the point 4*c* (216, 229), and the point 4*d* (0, 229), and generates an equation representing the curve 4*e*. Since the luminance value A2=251 calculated for the image illustrated in FIG. 2B is included in the region 4*f*, the selection unit 140 sets the luminance value A=251.

The case where the selection unit 140 generates the equation representing the curve 4*e* with the coordinates of four points has been described. However, for example, the selection unit 140 may generate the equation representing the curve 4*e* with the coordinates of only three points or five or more points.

Referring back to FIG. 1, the correction unit 150 corrects the gradation of the luminance values set for the pixels included in the display target image with the luminance value A determined by the selection unit 140. For example, the correction unit 150 corrects the gradation of the luminance values 0 to A to the gradation of the luminance values 0 to 255 by a proportional operation. More specifically, the correction unit 150 corrects the luminance value of each pixel included in the display target image by substituting it into the following equation (1). When the corrected luminance value exceeds 255, the corrected luminance value is changed to 255.

(corrected luminance value)=(uncorrected luminance value)*255/A (1)

For example, the correction unit 150 generates a corrected image by setting the corrected luminance value calculated with equation (1) for a corresponding pixel included in the display target image. The correction unit 150 outputs the generated corrected image to the output unit 170. The case where the correction unit 150 performs gradation correction on the luminance value of each pixel has been described. However, for example, the correction unit 150 may perform gradation correction on the R, G, and B values of each pixel. More specifically, the correction unit 150 calculates corrected R, G, and B values of each pixel by applying the above-described equation (1) to the R, G, and B values of the pixel.

Figure 5A:
FIG. 5A is a diagram illustrating an example of a corrected image.
Figure 5B:
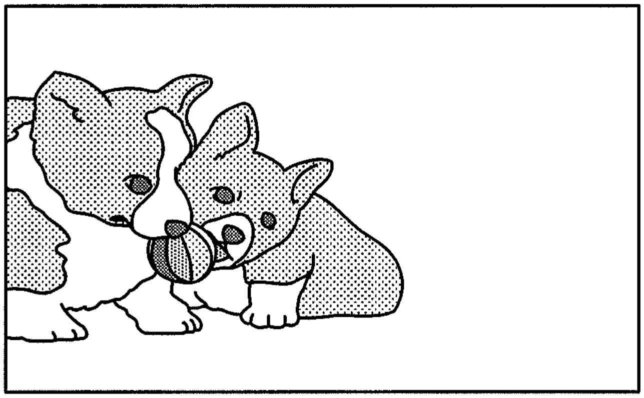
FIG. 5B is a diagram illustrating an example of a corrected image.

FIGS. 5A and 5B are diagrams illustrating examples of a corrected image. For example, in a case where the correction unit 150 performs processing according to this embodiment on the image illustrated in FIG. 2A, the corrected image illustrated in FIG. 5A is generated. For example, in a case where the correction unit 150 performs processing according to this embodiment on the image illustrated in FIG. 2B, the corrected image illustrated in FIG. 5B is generated.

The light amount calculation unit 160 calculates the amount of light for display of the corrected image generated by the correction unit 150 on the basis of the luminance value A determined by the selection unit 140. For example, the light amount calculation unit 160 calculates a light amount correction ratio used for correction of the amount of light on the basis of the luminance value A determined by the selection unit 140.

Figure 6:
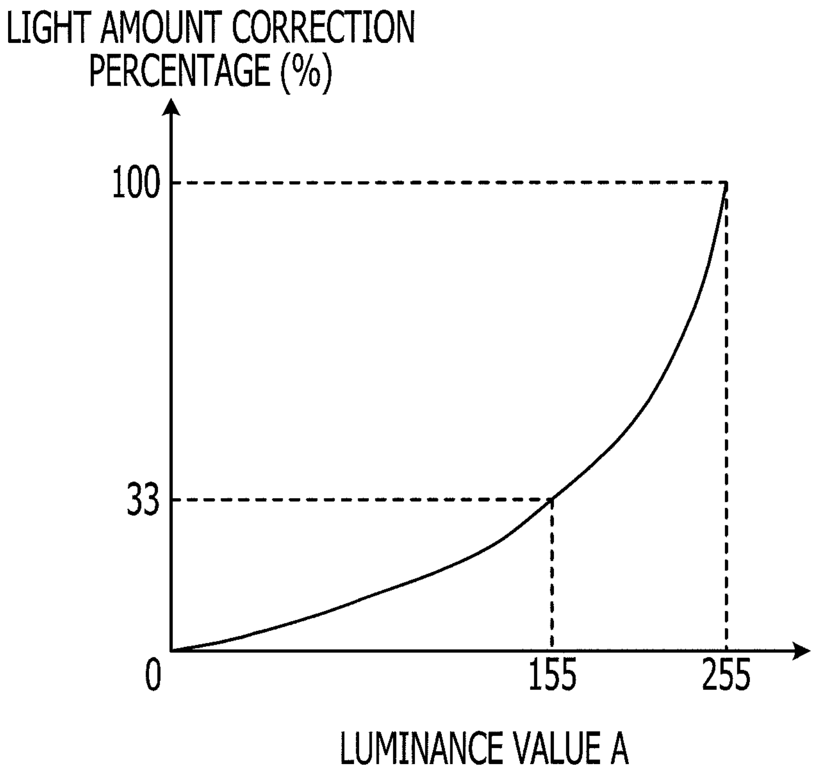
FIG. 6 is a diagram illustrating the relationship between a luminance value A and a light amount correction ratio.

FIG. 6 is a diagram illustrating the relationship between the luminance value A and a light amount correction ratio. In FIG. 6, the horizontal axis represents the luminance value A and the vertical axis represents a light amount correction ratio. As illustrated in FIG. 6, the relationship between the luminance value A and the light amount correction ratio is nonlinear. Since human visual sensitivity is high in low light, a portion having a relatively small luminance value can be recognized by human eyes even in low light. The relationship between the luminance value A and the light amount correction ratio is represented by the following equation (2).

(light amount correction ratio)=(luminance value A/255)$^{2.2}$*100 (2)

For example, the light amount calculation unit 160 calculates the light amount correction ratio of 33% by substituting the luminance value A=155 determined by the selection unit 140 into equation (2). The light amount calculation unit 160 outputs the calculated light amount correction ratio to the output unit 170. The case where the light amount calculation unit 160 calculates the light amount correction ratio with equation (2) has been described. However, for example, the light amount calculation unit 160 may calculate the light amount correction ratio assuming that the luminance value A and the light amount correction ratio are proportional to each other. The case where the light amount calculation unit 160 calculates the light amount correction ratio has been described. However, for example, the light amount calculation unit 160 may acquire the current amount of light of the display unit 182 and calculate the corrected amount of light by multiplying the acquired amount of light by the calculated light amount correction ratio.

The output unit 170 associates the corrected image generated by the correction unit 150 and the amount of light calculated by the light amount calculation unit 160 with each other and outputs them. For example, the output unit 170 associates the corrected image generated by the correction unit 150 and the light amount correction ratio calculated by the light amount calculation unit 160 with each other and outputs them to the display control unit 181.

The display control unit 181 controls display of an image on the display unit 182. For example, the display control unit 181 receives the corrected image and the amount of light from the output unit 170 and displays the received corrected image on the display unit 182 at the received amount of light. More specifically, the display control unit 181 receives the corrected image and the light amount correction ratio of 33% from the output unit 170. Subsequently, the display control unit 181 corrects the amount of light of a backlight for the display unit 182 in accordance with the light amount correction ratio of 33% and displays the received corrected image on the display unit 182 at the corrected amount of light.

The display unit 182 displays various pieces of information and an image. For example, the display unit 182 displays the corrected image received by the display control unit 181 at the amount of light received by the display control unit 181 under the control of the display control unit 181. The display unit 182 is, for example, a liquid crystal display or a touch panel.

Figure 7:
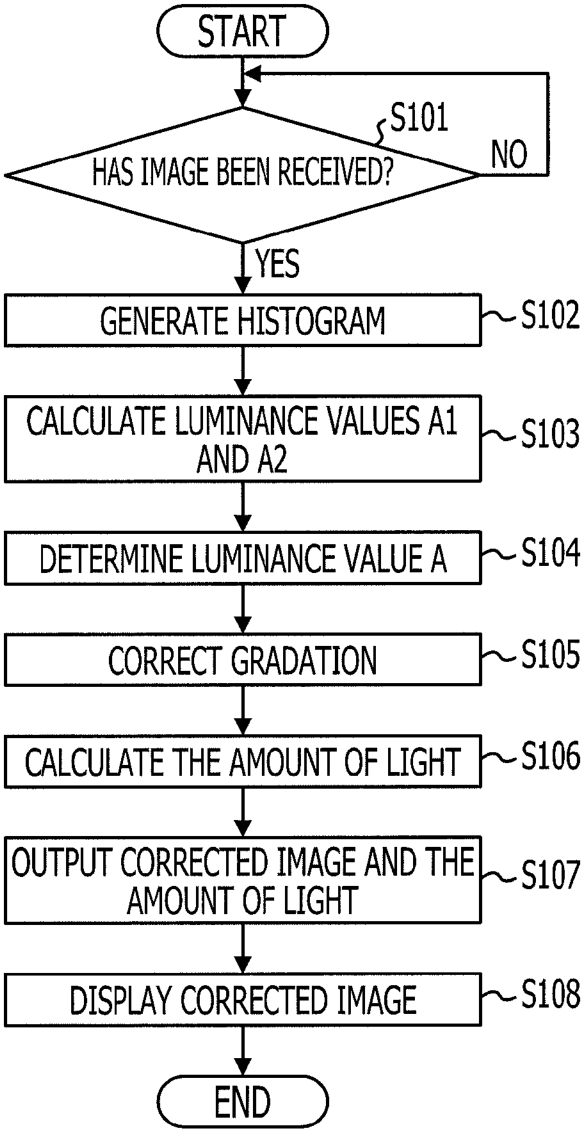
FIG. 7 is a flowchart illustrating a process performed by an image processing apparatus according to the first embodiment.

Next, a process performed by the image processing apparatus 100 according to the first embodiment will be described. FIG. 7 is a flowchart illustrating a process performed by an image processing apparatus according to the first embodiment. For example, the process illustrated in FIG. 7 is performed when the receiving unit 110 receives an output target image.

As illustrated in FIG. 7, when the receiving unit 110 receives a display target image (Yes in step S101), the generation unit 120 generates a histogram of luminance values of pixels included in the display target image (step S102).

The luminance value calculation unit 130 calculates from histogram the luminance value A1 corresponding to the ratio a1 of the pixels in descending order of their luminance values and the luminance value A2 corresponding to the ratio a2 of the pixels larger than the ratio a1 (step S103). The selection unit 140 compares the luminance values A1 and A2 calculated by the luminance value calculation unit 130 with each other and determines the luminance value A on the basis of a result of the comparison (step S104). For example, the selection unit 140 calculates the difference between the luminance values A1 and A2 calculated by the luminance value calculation unit 130. Subsequently, when the difference is smaller than a threshold value, the selection unit 140 sets the luminance value A2 as the luminance value A. When the calculated difference is equal to or larger than the threshold value, the selection unit 140 sets a value between the luminance values A2 and A1 as the luminance value A.

The correction unit 150 corrects the gradation of the luminance values set for the pixels included in the display target image with the luminance value A determined by the selection unit 140 (step S105). The light amount calculation unit 160 calculates the amount of light for display of a corrected image generated by the correction unit 150 with the luminance value A determined by the selection unit 140 (step S106). The output unit 170 associates the corrected image generated by the correction unit 150 and the amount of light calculated by the light amount calculation unit 160 with each other and outputs them (step S107).

When the image processing apparatus 100 includes the display apparatus 180, the display control unit 181 displays the corrected image on the display unit 182 (step S108). For example, the display control unit 181 receives the corrected image and the amount of light from the output unit 170 and displays the received corrected image on the display unit 182 at the received amount of light.

The above-described pieces of processing may not necessarily be performed in the above-described order. For example, the processing of step S105 and the processing of step S106 may be performed in parallel after the processing of step S104 has been performed.

The processing of step S106, which is processing for calculating the amount of light, may not necessarily be performed. That is, after the processing of step S105 has been performed, the processing of step S107 may be performed.

Next, the effect of the image processing apparatus 100 according to the first embodiment will be described. The image processing apparatus 100 generates a histogram of luminance values of pixels included in an image. The image processing apparatus 100 calculates from the generated histogram the luminance value A1 on the basis of a certain ratio of the number of all pixels in descending order and the luminance value A2 on the basis of another certain ratio which is larger than the certain ratio. The image processing apparatus 100 compares the calculated luminance values A1 and A2 with each other and determines the luminance value A on the basis of a result of the comparison. The image processing apparatus 100 corrects the gradation of the luminance values set for the pixels with the determined luminance value A. Accordingly, the image processing apparatus 100 can increase the contrast of a display target image while suppressing degradation in image quality. In particular, the image processing apparatus 100 can perform gradation correction on an image that tends to cause blown out highlights as illustrated in FIG. 12 so that blown out highlights can be invisible for a viewer as illustrated in FIG. 5A. That is, since the luminance value A used for gradation correction is made closer to the luminance value A1 in this embodiment, it is possible to increase the contrast of an image while suppressing degradation in image quality. For example, since the image processing apparatus 100 generates a corrected image whose contrast has been increased, it is possible to generate an image visible for a viewer even when a display screen is exposed to direct sunlight.

The image processing apparatus 100 calculates the difference between the luminance values A1 and A2 calculated from the histogram of luminance values. When the calculated difference is smaller than a threshold value, the image processing apparatus 100 sets the luminance value A2 as the luminance value A. On the other hand, when the calculated difference is equal to or larger than the threshold value, the image processing apparatus 100 sets a value between the luminance values A2 and A1 as the luminance value A. Accordingly, the image processing apparatus 100 can increase the contrast of a display target image by performing gradation correction on the image with the histogram of pixels included in the image.

For example, the minimization of power consumption of an in-car monitor is demanded in an electric car so as to preferentially supply power to a driving system. When the in-car monitor is a translucent liquid crystal display, the appearance of an image displayed on a screen is determined in accordance with the amount of light of a backlight and the light transmittance of a liquid crystal panel. For example, the appearance of an image when the amount of light of the backlight for the liquid crystal panel is 100% and the transmittance of the liquid crystal panel is 50% and the appearance of an image when the amount of light of the backlight for the liquid crystal panel is 50% and the transmittance of the liquid crystal panel is 100% are the same. Accordingly, in this case, in order to suppress power consumption, it is desired that the amount of light of the backlight be reduced. The image processing apparatus 100 corrects the gradation of luminance values in the display target image on the basis of the determined luminance value A. More specifically, the image processing apparatus 100 corrects the gradation of luminance values 0 to A to the gradation of luminance values 0 to 255 in the display target image. That is, for example, in the case of a pixel having the luminance value A, the luminance value of the pixel is set to 255 in a corrected image. Accordingly, a transmittance can be increased at the time of display of the corrected image. The image processing apparatus 100 calculates the amount of light for display of the corrected image on the basis of the luminance value A, associates the calculated amount of light and the corrected image with each other, and outputs them. A display apparatus displays the corrected image at the calculated amount of light. Thus, the image processing apparatus 100 can reduce the amount of light without significantly changing the appearance of an image for a viewer. This leads to the minimization of power consumption.

[Second Embodiment]

An embodiment has been described, but another embodiment can be considered. Another embodiment will be described below.

Figure 8:
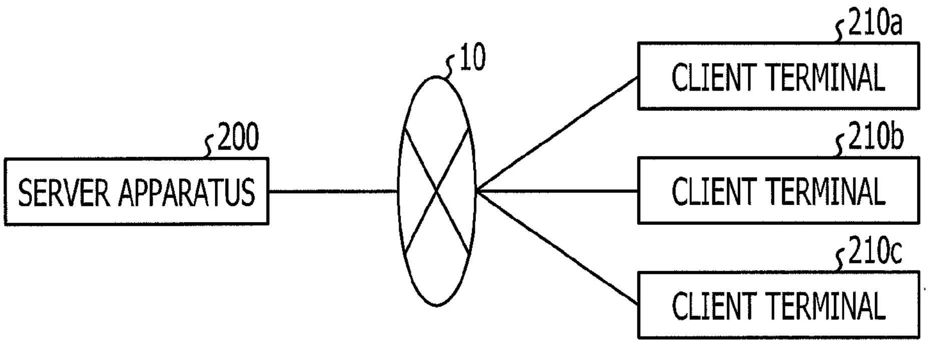
FIG. 8 is a diagram describing an example of an application to a client server system.

The image processing apparatus 100 according to the first embodiment can be applied to a client server system. FIG. 8 is a diagram describing an example of an application to a client server system. In the client server system illustrated in FIG. 8, a server apparatus 200 and client terminals 210*a* to 210*c* are connected via a network 10. The server apparatus 200 has a function similar to the function of the image processing apparatus 100 according to the first embodiment. The client terminals 210*a* to 210*c* are sometimes collectively referred to as client terminals 210. In this client server system, the server apparatus 200 functions as a cloud and the client terminals 210 transmit moving images to the server apparatus 200 that is a cloud. The server apparatus 200 performs processing similar to the processing of the image processing apparatus 100 on the moving images transmitted from the client terminals 210. The server apparatus 200 can store output images or transmit responses to the client terminals 210.

The configuration of the image processing apparatus 100 illustrate in FIG. 1 is illustrative only, and may not necessarily include all of the processing units illustrated in FIG. 1. For example, the image processing apparatus 100 may include only the generation unit 120, the luminance value calculation unit 130, the selection unit 140, and the correction unit 150.

That is, the generation unit 120 generates a histogram of luminance values of a plurality of pixels included in an image.

The luminance value calculation unit 130 calculates from the histogram generated by the generation unit 120 a first luminance value on the basis of a certain ratio of the number of all pixels in the image and a second luminance value corresponding to another ratio that is larger than the certain ratio. The selection unit 140 compares the first and second luminance values calculated by the luminance value calculation unit 130 with each other and determines a third luminance value on the basis of a result of the comparison. The correction unit 150 corrects the gradation of the luminance values set for the pixels with the third luminance value determined by the selection unit 140. As a result, the image processing apparatus 100 can increase the contrast of a display target image while suppressing degradation in image quality. In particular, the image processing apparatus 100 can perform gradation correction on an image that tends to cause blown out highlights as illustrated in FIG. 12 so that blown out highlights can be invisible for a viewer as illustrated in FIG. 5A. That is, since the luminance value A used for gradation correction is made closer to the luminance value A1 in this embodiment, it is possible to increase the contrast of an image while suppressing degradation in image quality. For example, since the image processing apparatus 100 generates a corrected image whose contrast has been increased, it is possible to generate an image visible for a viewer even when a display screen is exposed to direct sunlight.

Among the pieces of processing described in the first embodiment, all or part of the pieces of processing described as those automatically performed may be manually performed, and all or part of the pieces of processing described as those manually performed may be automatically performed. For example, the processing of the image processing apparatus 100 is automatically started when the receiving unit 110 receives an output target image as described previously, but may be manually started in response to a user's instruction. The processing procedure, the control procedure, the specific names, and information containing various pieces of data and parameters, which have been described above or illustrated in the drawings, may be optionally changed unless otherwise described. For example, the output unit 170 may output only the corrected image generated by the correction unit 150 to the display control unit 181.

The components included in the image processing apparatus 100 and the display apparatus 180 illustrated in FIG. 1 are functional concepts and may not be physically configured as illustrated in the drawing. That is, the separation or integration of the components included in the image processing apparatus 100 and the display apparatus 180 are not limited to that illustrated in the drawing. All or part of the components may be optionally separated or integrated in accordance with various loads or the condition under which they are used. For example, the display apparatus 180 may have the function of the light amount calculation unit 160 illustrated in FIG. 1.

The image processing apparatus 100 may be obtained by providing the function of the image processing apparatus 100 for a known information processing apparatus. The known information processing apparatus is, for example, a personal computer, a workstation, a mobile telephone, a Personal Handy-phone System (PHS) terminal, a mobile radio communication terminal, or a Personal Digital Assistant (PDA).

Figure 9:
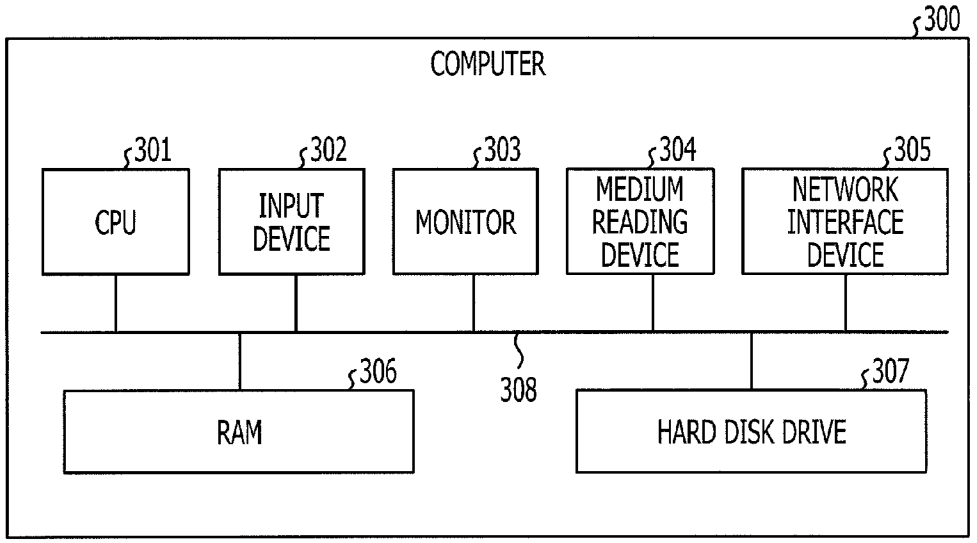
FIG. 9 is a diagram illustrating a computer that executes an image processing program.

FIG. 9 is a diagram illustrating a computer for executing an image processing program. As illustrated in FIG. 9, a computer 300 includes a Central Processing Unit (CPU) 301 for performing various pieces of computation processing, an input device 302 for receiving data input by a user, a monitor 303, a medium reading device 304 for reading out, for example, a program, from a storage medium, a network interface device 305 for transmitting or receiving data to or from another device, a Random Access Memory (RAM) 306 for temporarily storing various pieces of information, and a hard disk drive 307. The devices 301 to 307 are connected to a bus 308. However, the storage medium does not include a transitory medium such as a propagation signal.

The hard disk drive 307 stores various programs having functions similar to the functions of the generation unit 120, the luminance value calculation unit 130, the selection unit 140, and the correction unit 150 illustrated in FIG. 1.

The CPU 301 reads out various programs from the hard disk drive 307, develops the programs in the RAM 306, and executes the programs, so that the programs function as various processes. That is, various programs function as processes similar to the receiving unit 110, the generation unit 120, the luminance value calculation unit 130, the selection unit 140, and the correction unit 150.

Each of the network interface device 305 and the input device 302 inputs an image into the receiving unit 110.

The above-described various programs may not necessarily be stored in the hard disk drive 307. For example, the computer 300 may read out a program stored in a computer-readable recording medium and execute the program. The computer-readable recording medium is, for example, a portable recording medium such as a CD-ROM, a DVD disc, or a USB memory, a semiconductor memory such as a flash memory, or a hard disk drive. Alternatively, a program may be stored in an apparatus connected to a public line, the Internet, a Local Area Network (LAN), or a Wide Area Network (WAN), and the computer 300 may read out the program from the apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. An image processing apparatus comprising:

a generation unit configured to generate a histogram of luminance values of a plurality of pixels included in an image;

a luminance value calculation unit configured to calculate a first luminance value to which a first ratio of the plurality of pixels corresponds in descending order of the luminance values of the histogram, and a second luminance value to which a second ratio of the plurality of pixels corresponds, the second ratio being larger than the first ratio;

a selection unit configured to compare the first luminance value and the second luminance value, and determine a third luminance value that is set a maximum luminance value in gradation correction on the basis of a result of the comparing, the selection unit calculating a difference between the first luminance value and second luminance value, setting the second luminance value as the third luminance value when the difference is smaller than a threshold value, and setting a value between the second luminance value and the first luminance value as the third luminance value when the difference is equal to or larger than the threshold value; and a correction unit configured to perform the gradation correction that corrects the luminance values of the plurality of pixels on the basis of the third luminance value and generates a corrected image.

2. An image processing apparatus comprising:

a memory; and a processor coupled to the memory and configured to:

generate a histogram of luminance values of a plurality of pixels included in the image, calculate a first luminance value to which a first ratio of the plurality of pixels corresponds in descending order of the luminance values of the histogram, calculate a second luminance value, to which a second ratio of the plurality of pixels corresponds, the second ratio being larger than the first ratio compare the first luminance value and the second luminance value, determine a third luminance value that is set a maximum luminance value in gradation correction on the basis of a result of the comparing, calculate a difference between the first luminance value and the second luminance value, to set the second luminance value as the third luminance value when the difference is smaller than a threshold value, and to set a value between the second luminance value and the first luminance value as the third luminance value when the difference is equal to or lager than the threshold value, and perform the gradation correction that corrects the luminance values of the plurality of pixels on the basis of the third luminance value and generate a corrected image.

3. The image processing apparatus according to claim 2, wherein the processor is further configured to:

calculate the amount of light of a light source included in a display apparatus on the basis of the third luminance value; and associate the corrected image and the amount of light calculated with each other and output the corrected image and the amount of light to the display apparatus.

4. The image processing apparatus according to claim 3, wherein the processor is configured to calculate the amount of light corresponding to the determined third luminance value on the basis of a nonlinear function representing a relationship between each of a plurality of luminance values and the amount of light.

5. The image processing apparatus according to claim 2, wherein the processor is configured to calculate a function representing a value for which the maximum luminance value is to be set for each of a plurality of luminance values in the gradation correction, on the basis of the first luminance value calculated and to set the value that is represented by the function and corresponds to the second luminance value calculated as the third luminance value.

6. The image processing apparatus according to claim 2, wherein the first ratio is set to a value with which blown out highlights are invisible for a viewer regardless of the luminance values of the pixels in the image, and the second ratio is set to another value with which the blown out highlights are visible for the viewer in accordance with the luminance value of the pixels in the image.

7. A non-transitory storage medium storing an image processing program that causes a computer to execute:

generating a histogram of luminance values of a plurality of pixels included in an image;

calculating a first luminance value to which a first ratio of the plurality of pixels correspond in descending order of the luminance values of the histogram;

calculating a second luminance value to which a second ratio of the plurality of pixels corresponds, the second ratio being larger than the first ratio;

comparing the first luminance value and the second luminance value;

determining a third luminance value that is set a maximum luminance value in gradation correction on the basis of a result of the comparing;

calculating a difference between the first luminance value and the second luminance value;

setting the second luminance value as the third luminance value when the difference is smaller than a threshold value and a value between the second luminance value and the first luminance value as the third luminance value when the difference is equal to or larger than the threshold value; and performing the gradation correction that corrects the luminance values of the plurality of pixels on the basis of the third luminance value and generates a corrected image.

8. The non-transitory storage medium according to claim 7, wherein the image processing program further causes the computer to, calculate the amount of light of a light source included in the display apparatus on the basis of the third luminance value, and associate the corrected image and the amount of light with each other and output the corrected image and the amount of light to the display apparatus.

9. The non-transitory storage medium according to claim 7, wherein the determining the third luminance value includes:

calculating a function representing a value for which the maximum luminance value is to be set for each of a plurality of luminance values in the gradation correction, on the basis of the first luminance value calculated by the luminance value calculation unit, and setting the value that is represented by the function and corresponds to the second luminance value calculated by the luminance value calculation unit as the third luminance value.

10. An image processing method executed by a computer, the image processing method comprising:

generating a histogram of luminance values of a plurality of pixels included in an image;

calculating a first luminance value to which a first ratio of the plurality of pixels corresponds in descending order of the luminance values of the histogram;

calculating a second luminance value to which a second ratio of the plurality of pixels corresponds, the second ratio being larger than the first ratio;

comparing the first luminance value and the second luminance value;

determining a third luminance value that is set a maximum luminance value in gradation correction on the basis of a result of the comparing; and performing the gradation correction that corrects the luminance values of the plurality of pixels on the basis of the third luminance value and generates a corrected image, wherein, in the determining the third luminance value, a difference between the first luminance value and the second luminance value is calculated, the second luminance value is set as the third luminance value when the difference is smaller than a threshold value, and a value between the second luminance value and the first luminance value is set as the third luminance value when the difference is equal to or larger than the threshold value.

11. The image processing method according to claim 10, further comprising:

calculating the amount of light of a light source included in the display apparatus on the basis of the third luminance value; and associating the corrected image and the amount of light with each other and outputting the corrected image and the amount of light to the display apparatus.

12. The image processing method according to claim 10, wherein, in the determining the third luminance value, a function representing a value for which the maximum luminance value is to be set for each of a plurality of luminance values in the gradation correction, is calculated on the basis of the first luminance value and the value that is represented by the function and corresponds to the second luminance value is set as the third luminance value.

* * * * *

UNITED STATES PATENT AND TRADEMARK OFFICE
CERTIFICATE OF CORRECTION

PATENT NO. : 8,837,829 B2
APPLICATION NO. : 13/404332
DATED : September 16, 2014
INVENTOR(S) : Masayoshi Shimizu It is certified that error appears in the above-identified patent and that said Letters Patent is hereby corrected as shown below:

In the Claims

Column 13, Line 28, In Claim 2, delete “lager” and insert -- larger --, therefor.

Signed and Sealed this
Twenty-third Day of December, 2014

Michelle K. Lee

Michelle K. Lee
*Deputy Director of the United States Patent and Trademark Office*